(12) United States Patent
Lawton et al.

(10) Patent No.: US 6,266,054 B1
(45) Date of Patent: *Jul. 24, 2001

(54) AUTOMATED REMOVAL OF NARROW, ELONGATED DISTORTIONS FROM A DIGITAL IMAGE

(75) Inventors: Daryl T. Lawton, Bellevue; Mahmood G. Qadir, Redmond, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,629

(22) Filed: Nov. 5, 1997

(51) Int. Cl.[7] .............................. G06F 13/00; G06K 9/40

(52) U.S. Cl. .................... 345/326; 382/190; 382/199; 382/202; 382/205; 382/275

(58) Field of Search ....................... 382/22, 115–118, 382/164–167, 190–196, 199, 202, 205, 203, 254–275, 307–311, 323; 345/326

(56) References Cited

U.S. PATENT DOCUMENTS

| | | | |
|---|---|---|---|
| 4,189,744 | 2/1980 | Stern | 358/93 |
| 4,590,520 | 5/1986 | Frame et al. | 358/163 |
| 5,119,439 | * 6/1992 | Osawa et al. | 382/22 |
| 5,130,789 | 7/1992 | Dobbs et al. | 358/75 |
| 5,233,670 | * 8/1993 | Dufour et al. | 382/22 |

(List continued on next page.)

OTHER PUBLICATIONS

Four separate screen shots(four sheets) from Adobe Photo-Deluxe (Version 1.0) showing steps to remove red eye.

LivePix 1.0 screen shot entitled "owen standing in crib with red eye" and help topic on "Remove red eye from a photo" (2 pages).

Adobe Photoshop® version 4.0 User Guide including Table of Contents and selected pages.

Akamatsu, et al., "An Accurate and Robust Face Identification Scheme," *IEEE*, 217–220 (1992).

Brunelli, et al., "Carcatural Effects in Automated Face Perception", *Biological Cybernetics*, 69, 235–241 (1993).

Chen, et al., "Human Face Recognition From a Single Front View," *International Journal of Pattern Recognition and Artifical Intelligence*, 6 (4), 571–693 (1992).

Chow, et al., "Towards a System for Automatic Facial Feature Detection," *Pattern Recognition*, 26 (12) 1739–1755 (1993).

Huang, et al., "Automatic Feature Point Extraction on a Human Face in Model–based Image Coding," *Optical Engineering*, 32 (7), 1571–1580 (1993).

(List continued on next page.)

Primary Examiner—Ba Huynh
(74) Attorney, Agent, or Firm—Leydig, Voit & Mayer, Ltd.

(57) ABSTRACT

An apparatus including a method of digital image processing which allows a user to remove narrow, elongated areas of image distortion from a digitized image. According to the method, the user selects a portion of an image to be edited and, once the portion has been identified, the image distortion within the portion is automatically removed. The procedure for removing the distortion includes the steps of delineating the distortion within the portion of the image selected and replacing the delineated area with a correction image which is created as a function of the attributes of the neighboring portions of the image.

23 Claims, 11 Drawing Sheets

U.S. PATENT DOCUMENTS

| | | | |
|---|---|---|---|
| 5,247,610 | 9/1993 | Oshima et al. | 345/435 |
| 5,327,246 | 7/1994 | Suzuki | 348/246 |
| 5,432,863 | 7/1995 | Banati et al. | 382/167 |
| 5,490,245 | 2/1996 | Wugofski et al. | 345/348 |
| 5,805,745 | 9/1998 | Graf | 382/291 |
| 5,825,941 | 10/1998 | Linford et al. | 382/294 |
| 5,920,344 | 6/1999 | Kim | 348/246 |
| 5,974,194 * | 10/1999 | Hirani et al. | 382/262 |

OTHER PUBLICATIONS

Huang, et al., "Human Facial Feature Extraction for Face Interpretation and Recognition," *IEEE*, 25 204–207, (1990).

Huang, et al. "Human Facial Feature Extraction for Face Interpretation and Receognition," *Pattern Recognition*, 25 (12), 1435–1444 (1992).

Kamel, et al. "System for the Recognition of Human Faces," *IBM Systems Journal*, 32 (2), 307–320 (1993).

Samal, et al. "Automatic Recognition and Analysis of Human Faces and Facial Exressions; A Survey," *Pattern Recognition*, 25 (1), 65–77 (1992).

* cited by examiner

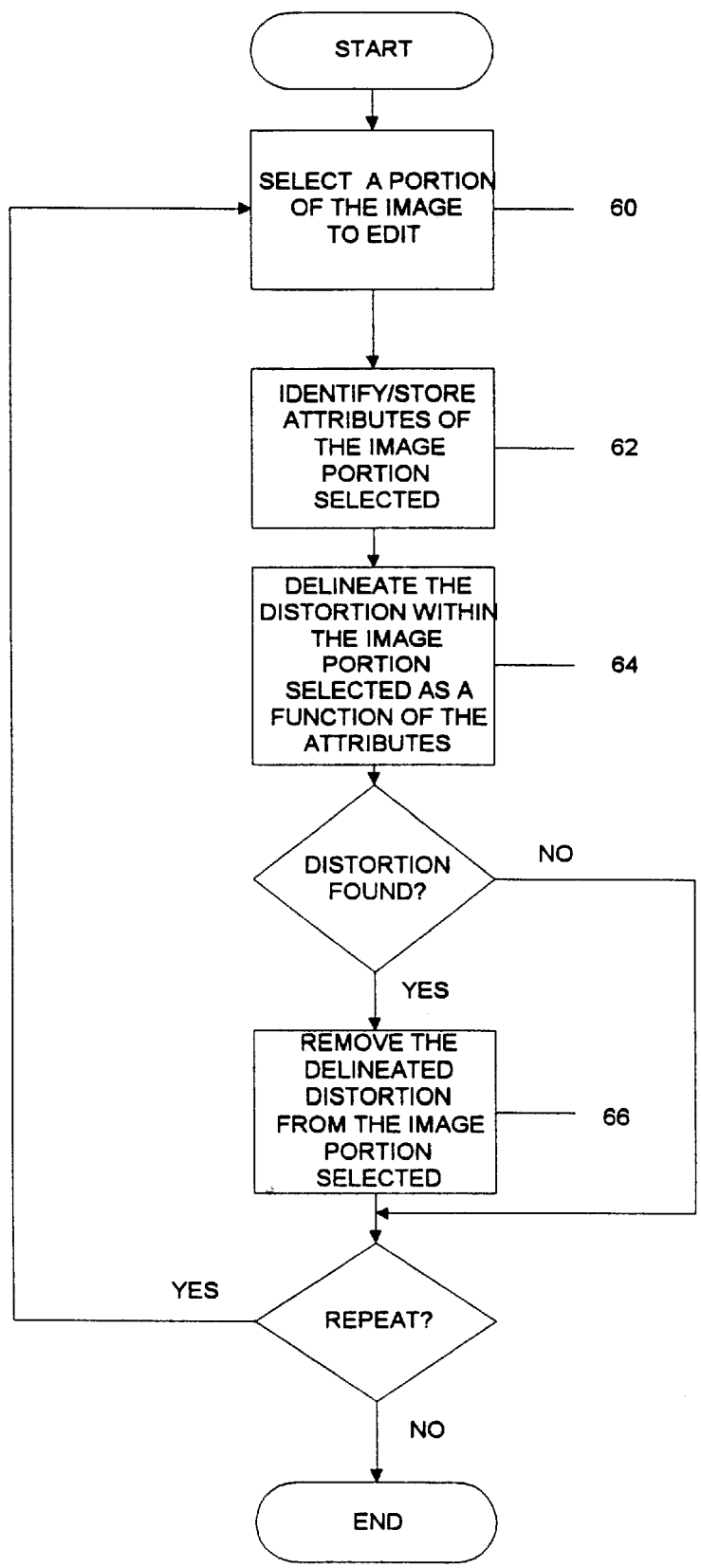

AUTOMATED REMOVAL OF NARROW, ELONGATED DISTORTIONS FROM A DIGITAL IMAGE

CROSS-REFERENCE TO RELATED APPLICATIONS

This application is related to commonly owned U.S. patent application Ser. No. 08/964,717 entitled "USER DIRECTED DUST AND COMPACT ANOMALY REMOVER FROM DIGITAL IMAGES" to Lawton and Qadir, filed concurrently herewith.

FIELD OF THE INVENTION

This invention relates to digital image processing and, more particularly, to removing narrow, elongated distortions from a digital image.

BACKGROUND OF THE INVENTION

Digital image processing has become a significant form of image processing because of continuing improvements in techniques and increasingly powerful hardware devices. Digital image processing techniques have augmented and, in some instances, replaced methods used by photographers in image composition and dark room processing. For example, digital image processing techniques such as contrast balancing, edge sharpening, color balancing, or retouching of distortions are employed for editing original photographic images. Moreover, with the aid of a computer, digitized images can be edited to achieve a variety of effects such as changing the shapes and colors of objects and forming composite images.

In particular, digital image processing techniques are utilized to remove distortions from photographic images which often arise when photographs in a physical format, such as films or prints, deteriorate through use and age. An especially common form of deterioration occurs when the photographs are scratched, folded, or torn. These forms of deterioration typically cause relatively narrow, elongated regions of distortion in the image where the original image information has been lost.

A common technique for removing such distortions employs digital painting to subjectively cover or replacement the area of image distortion with a corrected image in much the same manner as an artist paints a canvas. While this technique works for its intended purpose, it is seen as relatively impractical for persons unskilled in digital painting and may require them to use specialized input devices to reduce errors.

While, the progress of integrated circuit technology in recent years has made it feasible to implement advanced graphic editing techniques in a computing environment at a lower relative cost which may be used to, among other things, remove image distortions, these graphic editing techniques continue to remain relatively complex or provide results which introduce distortions into the overall image. For example, one current imaging application sold under the brand name "ADOBE PHOTOSHOP" offers a correction tool which applies a median filter over the complete image for the purpose of removing a distortion through the blurring thereof to the point where it is no longer noticeable. Unfortunately, this process also tends to blur the details of the remaining portions of the digitized image causing a degradation in overall image quality.

Another approach requires the user to utilize a cursor to delineate the area of distortion, after which pixels from areas surrounding the distortion are utilized to replacement in lost image information. This approach is believed to be used in the imaging application sold under the brand name "KAI'S PHOTO SOAP" by Metatools Inc. While this approach provides an image having an overall better quality relative to the technique discussed previously, the amount of manual dexterity needed to specify the region of distortion renders the technique relatively complex to use.

In light of the foregoing, a need exists for a method and apparatus for removing narrow, elongated distortions from a digital image without requiring technical skill, artistic ability, or manual dexterity on the part of the user. Such a system would allow an unskilled user to remove those types of distortions from a photograph while maintaining overall image quality without requiring undue expense or the assistance of a specialist.

SUMMARY OF THE INVENTION

According to the invention, an apparatus and method automatically edits a digital image to remove an unwanted region therefrom, such as a narrow, elongated region of image distortion, in response to a minimal amount of user interaction. To initiate the method, the user selects a portion of an image being displayed on a display device which is to be edited. This selection may be done utilizing a user sizable box which functions to enclose a portion of the image. Once the portion of the image to be edited has been selected, the area of image distortion within the portion is automatically delineated for further processing and removal.

The delineating of the image distortion is accomplished by collecting information regarding the attributes of the portion of the digital image selected and comparing these attributes against a defined criteria. Once the area of image distortion has been delineated within the selected portion of the digital image, further processing functions to remove the image distortion by replacing the image distortion in the delineated area with a correction image which is created as a function of the characteristics of portions of the image which neighbor the delineated distortion. In particular, the correction image is subsequently composited with the digital image to effectively remove the unwanted regions thereof. In this manner, a non-expert user may fix such image distortions by simply initiating the process, for example, by positioning the box, and allowing the task to automatically perform the detailed analysis required to remove the unwanted regions from the digital image.

Additional features and advantages of the invention will be made apparent from the following detailed description of illustrative embodiments which proceeds with reference to the accompanying figures.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a flow chart diagram of a method for editing digital images in accordance with the subject invention;

DETAILED DESCRIPTION OF THE INVENTION

Figure 1:
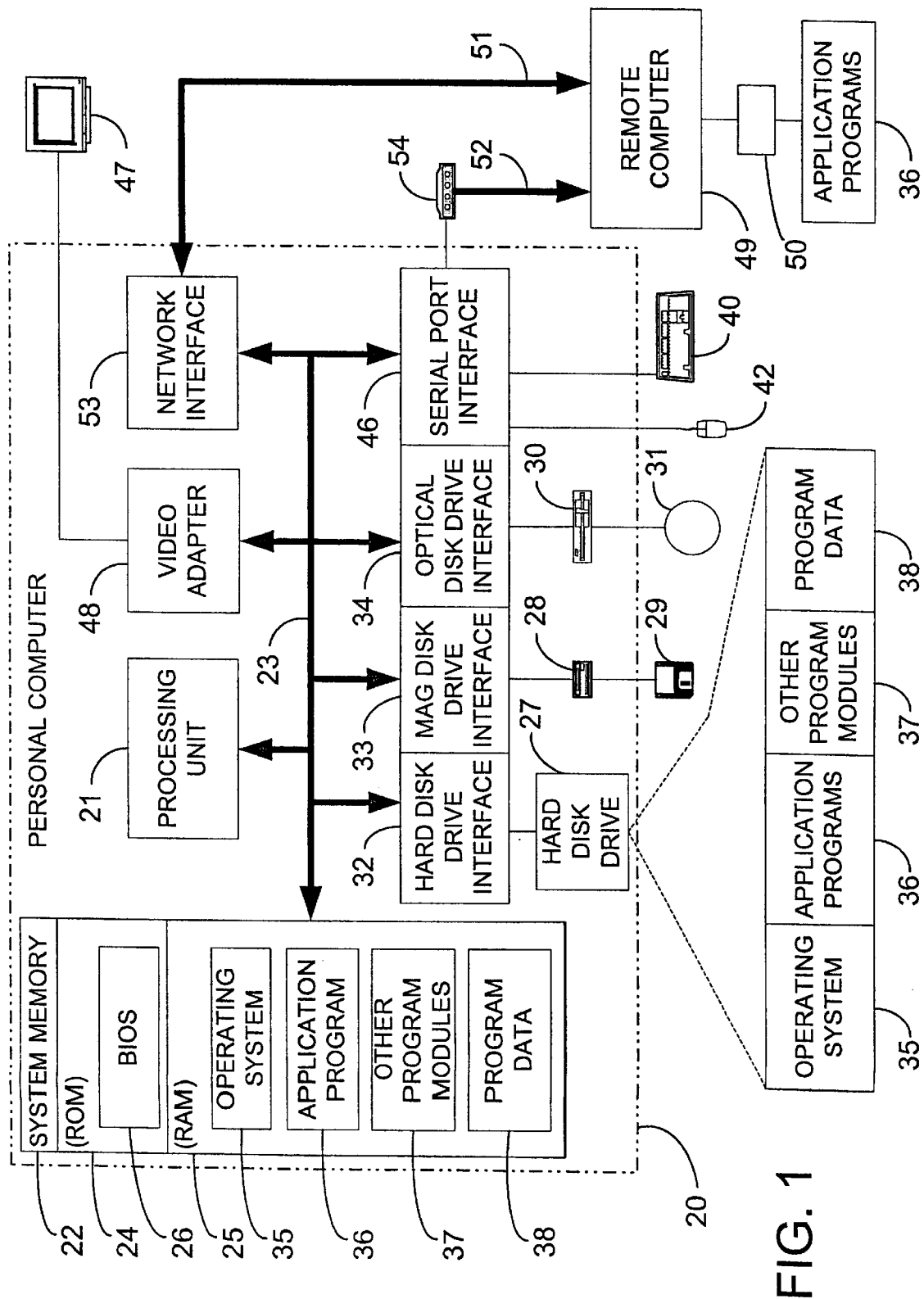
FIG. 1 is a block diagram of an exemplary computer system for editing digital images in accordance with the subject invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such a magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by the computer system 20, unless indicated otherwise. As such, it will be understood that such acts and operations, which are at times referred to as being computer-executed, include the manipulation by the CPU 24 of electrical signals representing data in a structured form. This manipulation transforms the data or maintains it at locations in the memory system 22, which reconfigures or otherwise alters the operation of the computer system 20 in a manner well understood by those skilled in the art of computer systems. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As discussed, the subject invention preferably resides within the computer environment illustrated in FIG. 1 in the form of a computer-executable application 36 which is used to edit a digitized image of an original photograph to remove unwanted portions therefrom. The digitized image typically resides in RAM 25 after being downloaded from a scanner (not shown), the hard disk, the magnetic disk 29, or optical disk 31 or a like memory device associated with the remote computer 49. The digitized image is in a conventional form suitable for display on the monitor 47. Such images are typically stored in memory as graphic files comprising grids of pixel values. Furthermore, while the subject invention is described hereinafter as a method for removing those narrow, elongated distortions in a digitized image which often result from an original photograph being scratched, folded, or torn, the subject invention may also be used to remove other narrow elongated features in a digitized picture such as wrinkles, surgical scars, or the like. Accordingly, the term "distortion" is not meant to be limiting and is meant to include any anomaly or artifact in a digital image having the requisite shape.

Figure 2:
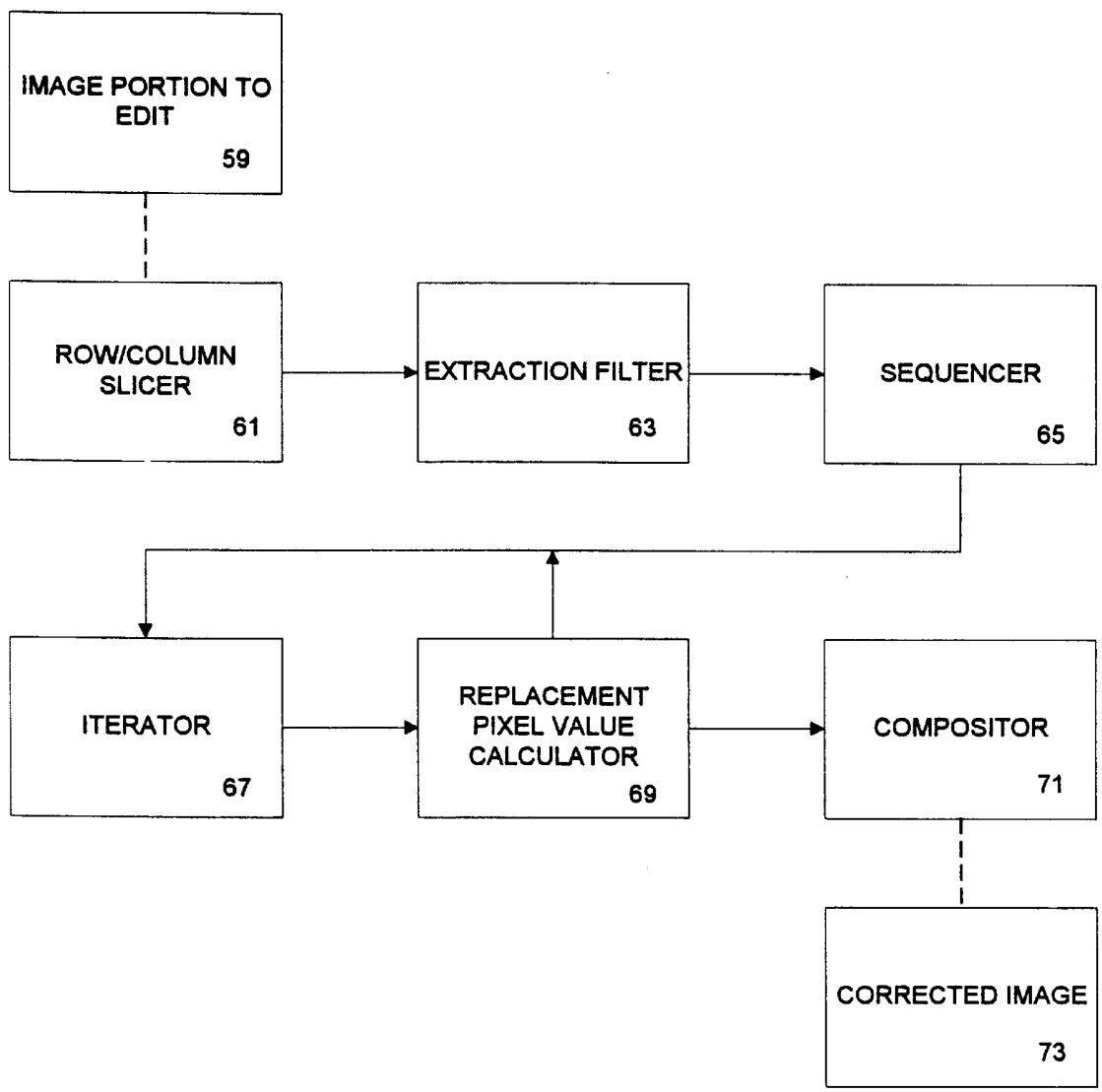
FIG. 2 is a block diagram of an exemplary tool realized by the computer system of FIG. 1 for editing digital images in accordance with the subject invention.

In accordance with a general overview of an embodiment of the subject invention, illustrated in FIGS. 2 and 3, a portion of a digitized image 59 is selected for editing in step 60 whereafter the attributes of the image portion selected are identified and stored in memory, such as the memory 22, in step 62. From these attributes stored in memory, it is automatically determined whether any distortions are resident within the selected image portion by first attempting to delineate such distortions in step 64 utilizing a computer-executed row/column slicer 61 and extraction filter 63. Upon delineating the distortion, a replacement image is formed utilizing a sequencer 65, iterator 67, and replacement pixel value calculator 69, which are also realized by the computer 20. The delineated distortion is thereafter removed in step 66 through the use of a compositor 71 which functions to composite the replacement image with the original digital image. In this general manner a corrected image 73 may be formed.

In a preferred embodiment of the invention, the user is responsible for selecting the portion of the image or pixel area which is to be edited. In particular, the digitized image is caused to be displayed on the monitor 47 in a known manner and the user is provided with a means for partitioning the image to select or define the portion of the image which is to be edited. The selection process is accomplished by providing the user with a control device, such as the mouse 42, with which the user may interact with the digitized image being displayed on the monitor 47.

More specifically, with reference to FIGS. 4A–4D, once the user has notified the computer 20 through some appropriate input procedure that the editing process is to start, for example, by activating an appropriate icon on a tool bar, pull down menu, etc. associated with a window, the user is provided with the ability, for example, through the use of the mouse 42, to position a selection rectangle 68 of adjustable length and width over a portion of the displayed, digitized image 70 in which the user has identified a region of narrow, elongated distortion 72. The selection rectangle is utilized to surround and define that portion of the image which is to be edited. It is preferred that a limit be imposed upon the adjustable width of the selection rectangle 68 in order to constrain the selected image portion to the image areas immediately surrounding the distortion to be removed. This constraint also allows the delineation and pixel removal procedures described hereinafter to be performed in a relatively time efficient manner. Providing the user with a rectangle for use in defining that portion of the image which is to be edited is preferred as it most closely follows the shape of the narrow, elongated distortions which are to be removed. However, it will be appreciated that other geometric shapes may be utilized without departing from the spirit of the subject invention.

Figure 4A:
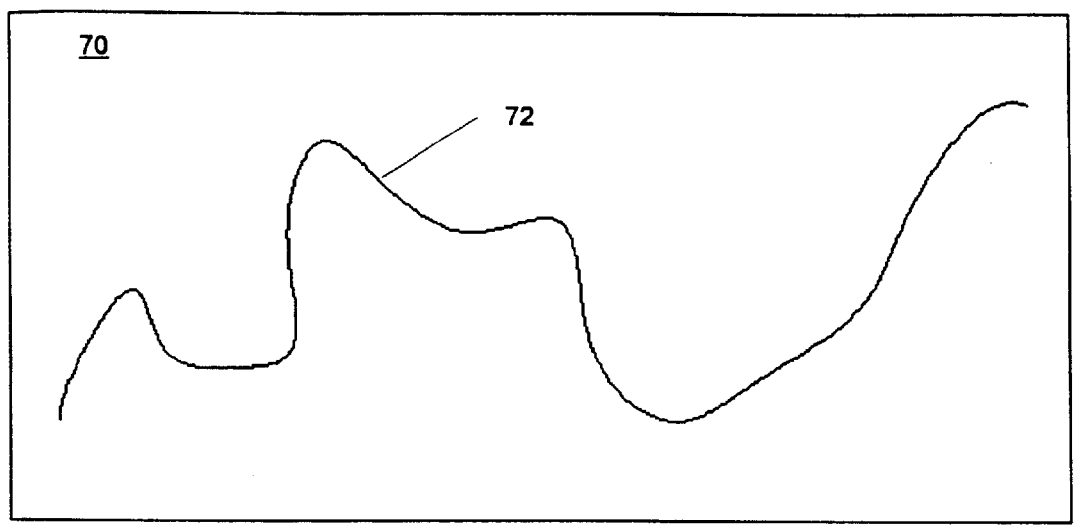
FIG. 4A is an illustrative view of an exemplary digital image having a narrow, elongated area of image distortion.
Figure 4B:
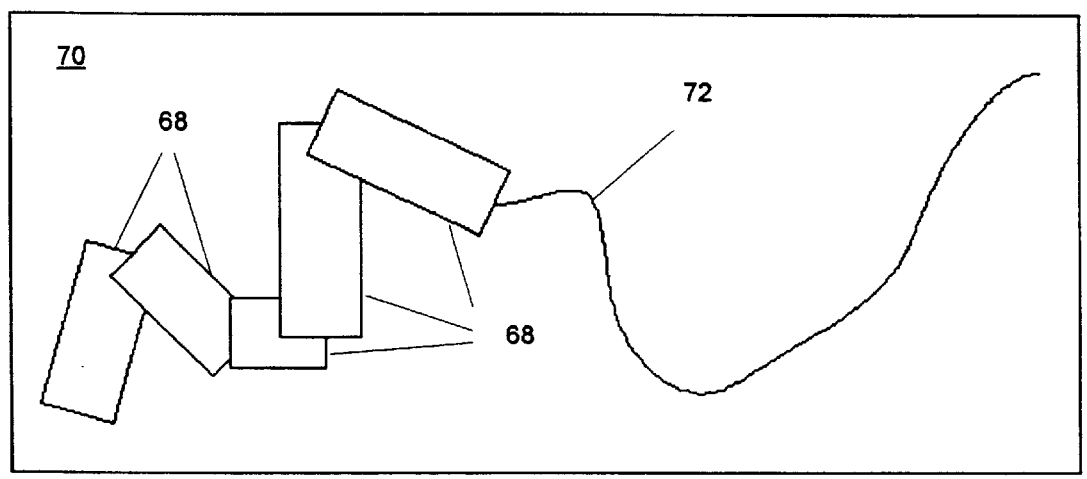
FIG. 4B is an illustrative view of the digital image of FIG. 4A after the step of selecting a portion of the image as set forth in FIG. 3 has been implemented.
Figure 4C:
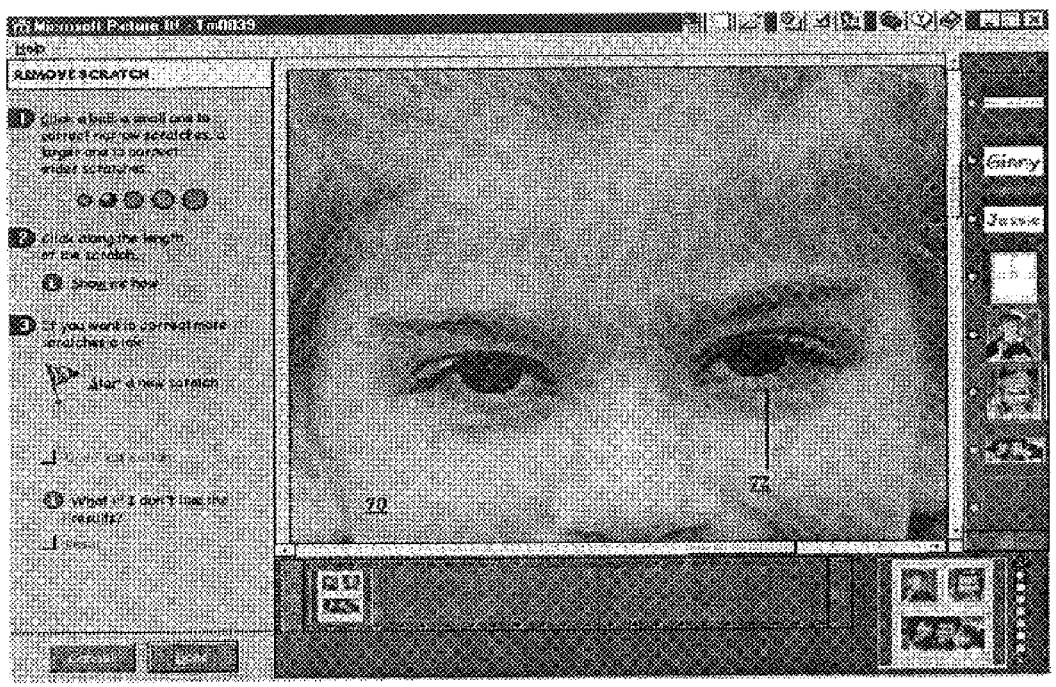
FIG. 4C is an illustrative view of an exemplary digital image having a narrow, elongated area of image distortion displayed in connection with a graphical users interface.
Figure 4D:
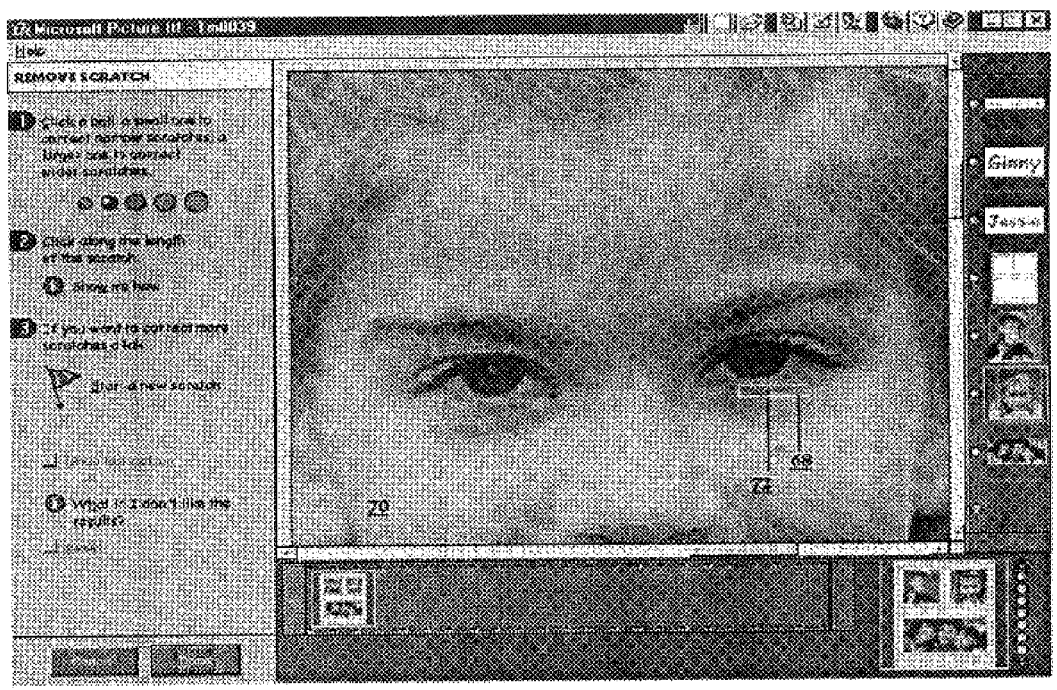
FIG. 4D is an illustrative view of the digital image of FIG. 4C after the step of selecting a portion of the image as set forth in FIG. 3 has been implemented.

As further illustrated in FIG. 4B, the user has the option of covering the distortion with one or more selection rectangles 68 before initiating the automated editing procedures. If more than one selection rectangle 68 is utilized, the procedures described hereinafter are preferably performed separately for each selected image portion. Furthermore, when multiple selection rectangles are utilized, a further embodiment of the invention automatically positions a portion of each subsequently positioned selection rectangle 68 such that it is caused to generally overlap an adjacent portion of the previously positioned selection rectangle 68 thereby ensuring that the distortion is continuously covered.

Figure 5:
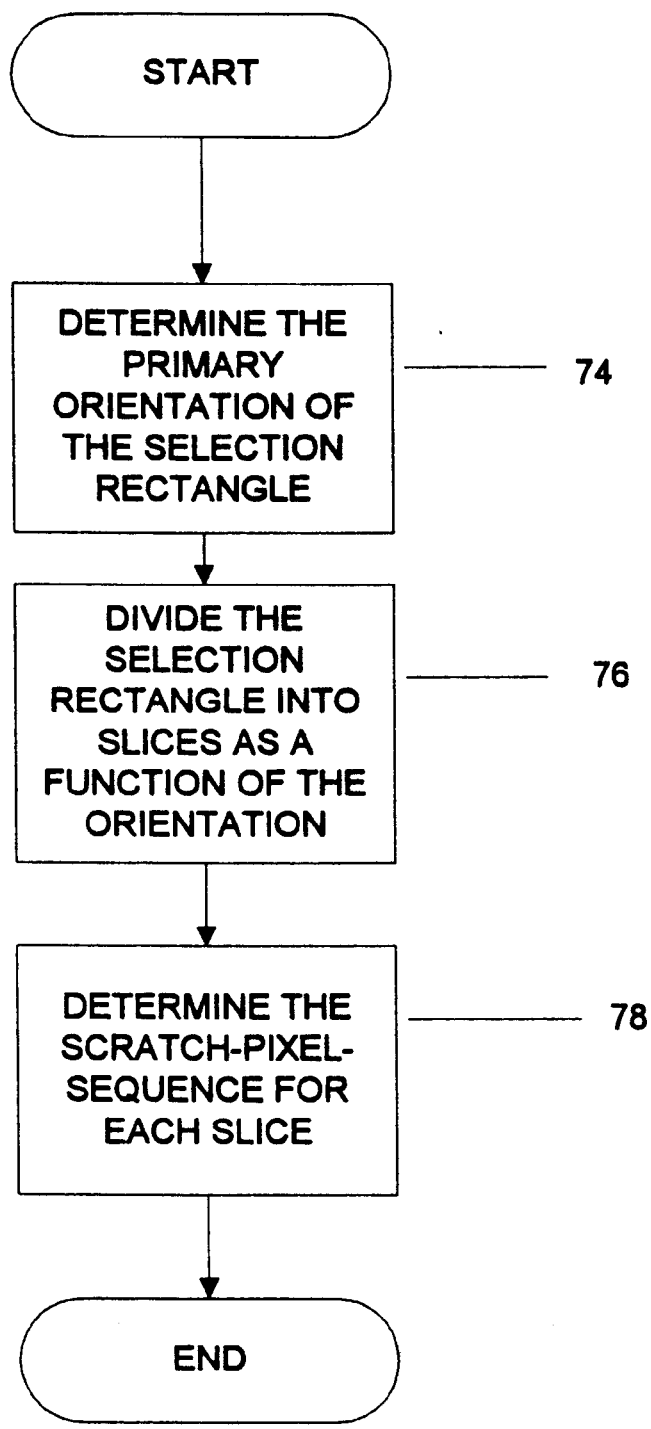
FIG. 5 is a flow chart diagram illustrating steps for identifying attributes of the selected portion of the image and delineating the distortion within the selected image portion as set forth in FIG. 3.
Figure 6A:
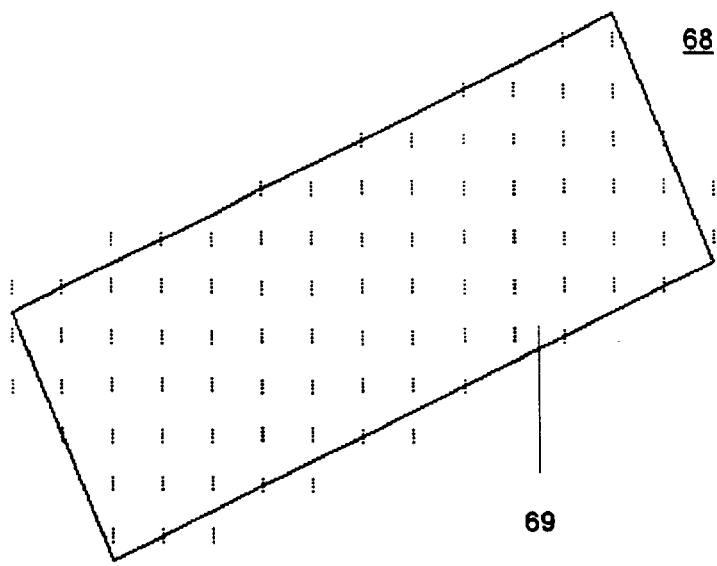
FIGS. 6A and 6B are illustrative views of the selected portion of the image being divided into slices in accordance with the steps set forth in FIG. 5.
Figure 6B:
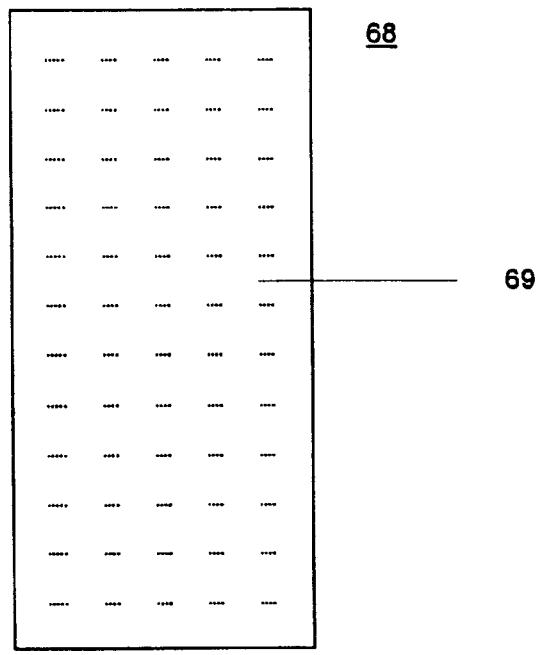

Once those portions of the image to be edited have been selected by the user, the user may initiate the further, automated editing of the image by again, for example, utilizing the mouse 42 or other input device to select an appropriate icon on a tool bar, pull down menu, etc. associated with a window. At this point, with reference to FIGS. 5, 6A, and 6B, the first step 74 in removing the distortion from the area of the image defined by the selection rectangle 68 is performed by the row/column slicer 61 which functions to: 1) determine whether the selection rectangle 68 is primarily oriented along the X or Y axis of the image; and 2) slice the selection rectangle 68 into a series of pixel rows or columns as a function of the determined orientation. Specifically, if the selection rectangle 68 is determined to be located primarily along the X axis, as depicted in FIG. 6A, the row/column slicer 61 slices the selection rectangle 68 in step 76 along the perpendicular Y axis. If the selection rectangle 68 is determined to be located primarily along the Y axis, as depicted in FIG. 6B, the row/column slicer 61 slices the selection rectangle 68 along the perpendicular X axis. Each slice 69 within the selection rectangle 68 is comprised of the pixels residing within the appropriate row or column. As will become apparent, the use of the slices 69 has the advantage of reducing the process of delineating the distortion within the selection rectangle 68 (the selected portion of the image to be edited) into a series of one-dimensional problems.

Figure 7:
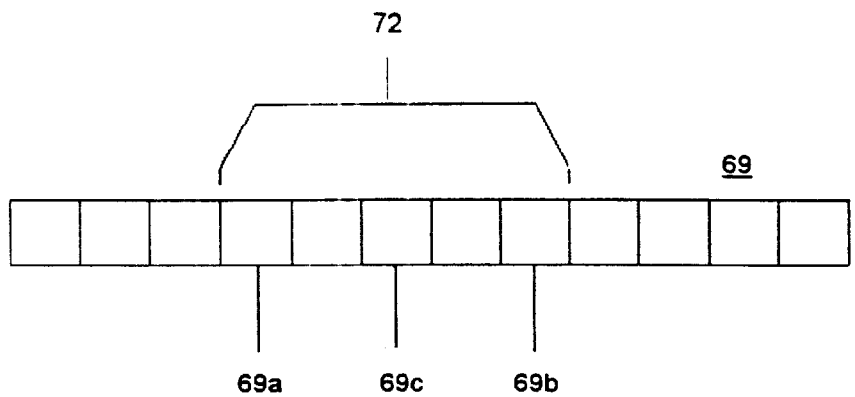
FIG. 7 is an illustrative example of a pixel slice in which a scratch-pixel-sequence has been defined in accordance with the steps set forth in FIG. 5.

The procedure continues in step 78 utilizing the extraction filter 63 to determine if a scratch-pixel-sequence exists in each of the slices 69. More specifically, the attributes of each of the pixels of each of the slices 69 is identified and examined according to a predefined criteria for the purpose of determining a connected sequence of pixels which functions to delineate the distortion within each of the slices 69 and, accordingly, within the selection rectangle 68. In a preferred embodiment of the invention, the scratch-pixel-sequence, an example of which is illustrated in FIG. 7, is defined to have endpoints 69a,69b such that: 1) the summed contrast magnitude at the endpoints is maximized; 2) the image gradient is in opposite directions at the endpoints; and 3) the point 69c with maximal contrast between the two endpoints has a contrast less than the contrast at either endpoint and less than a predefined threshold. By way of example, for color images, the contrast between successive pixels (p) is computed by the formula:

$$abs(p[i]_{RED}-p[i+1]_{RED})+abs(p[i]_{GREEN}-p[i+1]_{GREEN})+abs(p[i]_{BLUE}-p[i+1]_{BLUE})$$

and the signed contrast by the formula:

$$(p[i]_{RED}+p[i]_{GREEN}+p[i]_{BLUE})-(p[i+1]_{RED}+p[i+1]_{GREEN}+p[i+1]_{BLUE}).$$

Utilizing the above formulas, the present embodiment delineates a single, best distortion within each slice which is to be subsequently removed.

In a further embodiment of the invention, the process of delineating the distortion within each slice may also be biased as a function of the determined delineation of the distortion within neighboring slices whereby the inclusion of spurious pixels within the scratch-pixel-sequence is sought to be minimized. Furthermore, once a scratch-pixel-sequence is determined, several standard feature attributes are associated with it. For example, for each color component within the scratch-pixel-sequence, these features may include the mean, variance, minimum, and maximum values as well as the contrast magnitude at the endpoints. These features may be utilized in yet a further embodiment of the invention for the purpose of determining whether pixels within the image which neighbor the distortion have attributes which differ enough from the pixels found within the distortion, whereby the neighboring pixels may be used in the pixel removal process described hereinafter.

Figure 8:
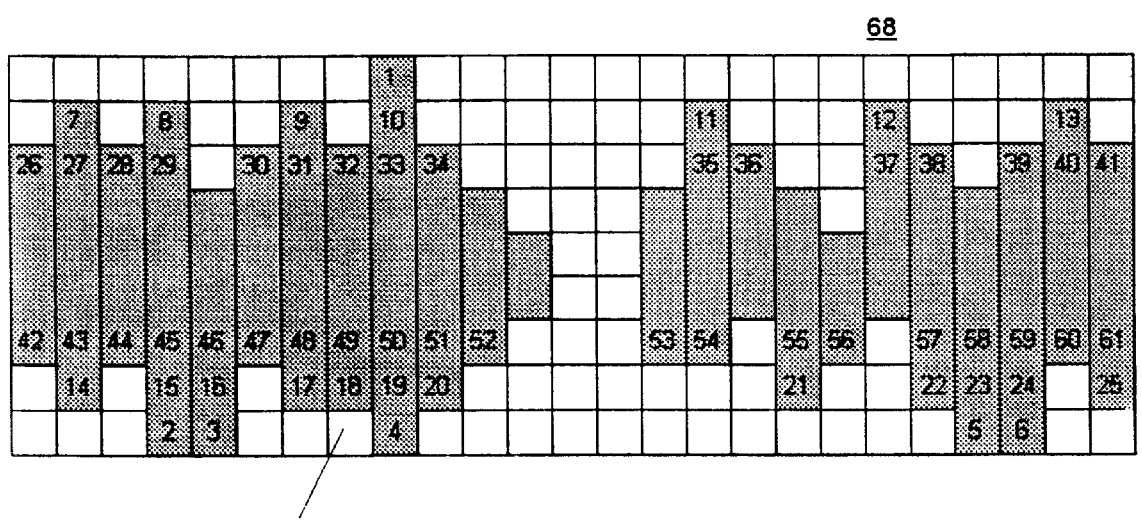
FIG. 8 is an illustrative example of the delineated image distortion which has been determined in accordance with the steps set forth in FIG. 5.

Turning to FIG. 8, an example of the distortion delineated within the slices 69 of a selection rectangle 68 is illustrated as darkened pixels. It will be noticed in FIG. 8 that it is possible for some or all of the slices 69 within the selection rectangle 68 to have no distortion delineated therein which results from the pixels failing to have the attributes required to establish a scratch-pixel-sequence. As illustrated in FIG. 3, if no scratch-pixel-sequences have been identified within the selection rectangle 68, the procedure will end without proceeding onward to the steps associated with removing the distortion.

Figure 9:
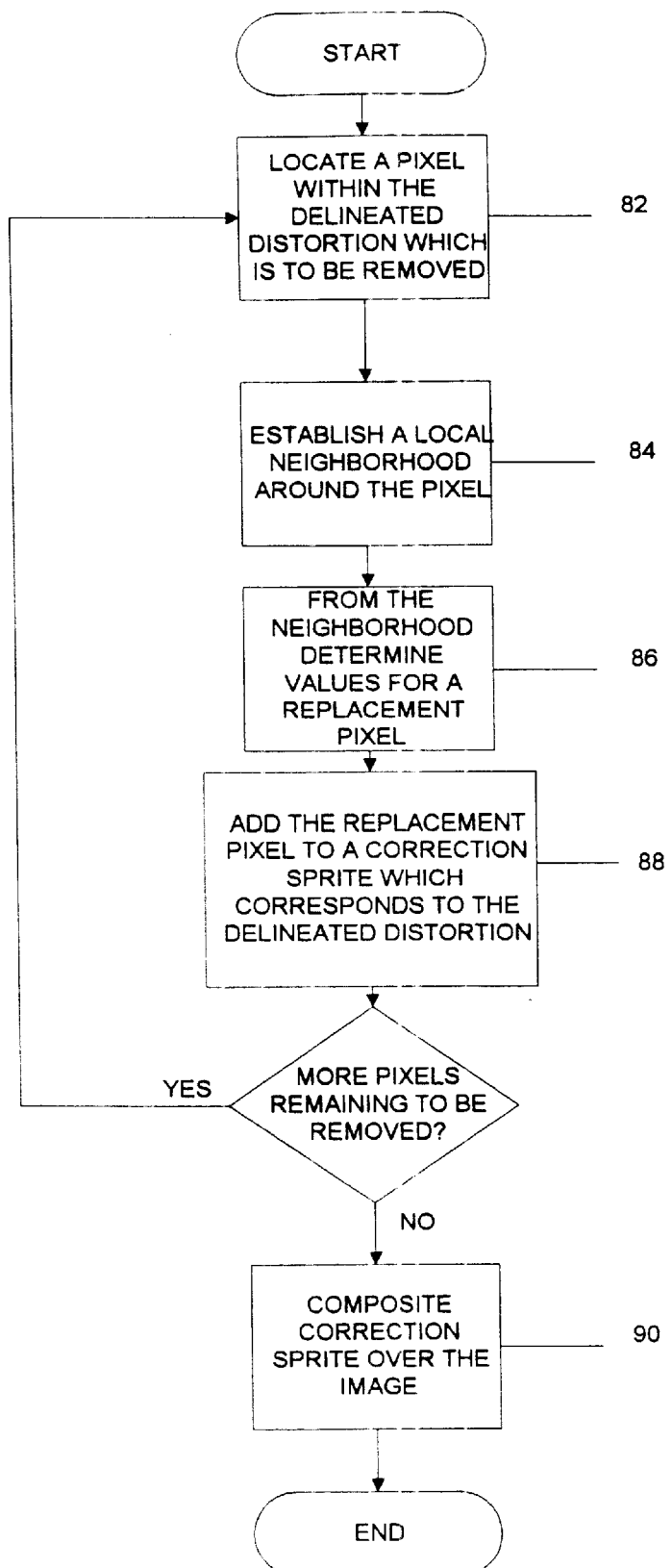
FIG. 9 is a flow chart diagram of the steps for removing the delineated distortion from the image portion selected as set forth in FIG. 3.

The steps associated with removing the distortion from within the selection rectangle 68 continue, as illustrated in FIG. 9, by locating in step 82 a pixel within the pixel area which is to be replaced. As specifically illustrated in FIG. 10 by the ascending numerical labels partially applied to the subset of pixels of the pixel area which comprise the delineated distortion, the pixels are located in an ordered sequence determined by the sequencer 65 which starts along one side of the distortion and then the other continually working toward the center thereof. It is in this order that the pixels which comprise the distortion are replaced in steps 84–88. This method of locating the pixels is especially desirable in that it maximizes the number of pixels which are available for use in the pixel replacement process discussed below.

Figure 10:
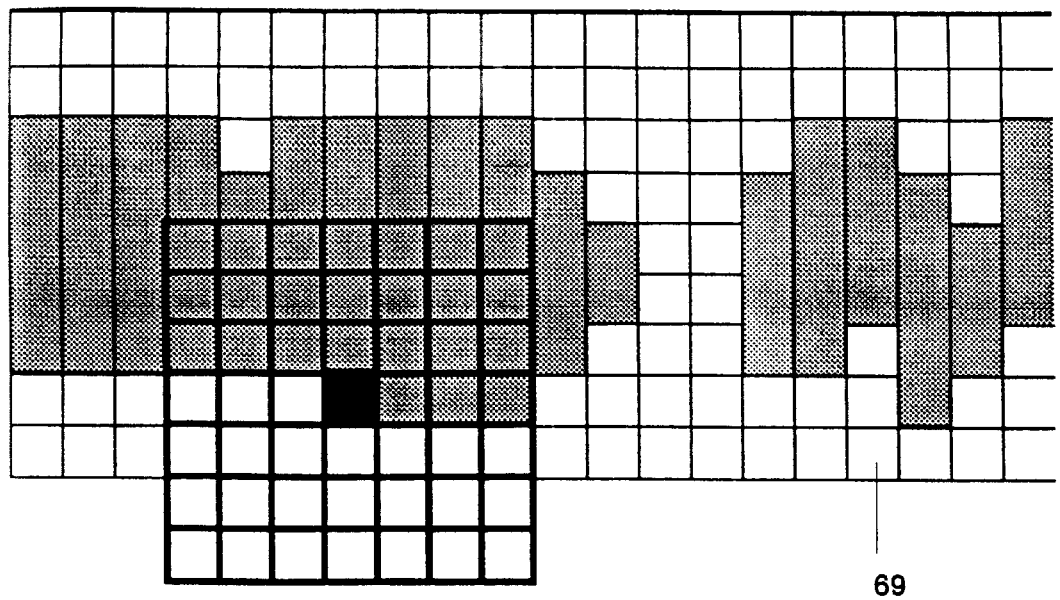
FIG. 10 is an illustrative example of the step of establishing a neighborhood around the pixel within the delineated distortion which is to be removed in accordance with the steps of FIG. 9.

More specifically, the iterator 67 is utilized to move to each pixel location within the delineated image distortion for the purpose of identifying the next pixel which is to be removed. The removal of each pixel is effectuated by compositing or replacing the pixel with a replacement pixel. In particular, once the iterator has fixed upon the pixel which is to be removed, the replacement pixel value calculator establishes a local neighborhood of pixels from which the values for the replacement pixel are determined. As seen in FIG. 10, the preferred neighborhood is a 7×7 matrix of pixels surrounding the pixel to be removed. It will be appreciated that neighborhoods of other shapes and sizes, for example a 5×5 rectangular neighborhood, a triangular neighborhood, etc., may also be used without departing from the scope of the subject invention. In the example shown in FIG. 10, pixels 1–16 of the delineated distortion have undergone the removal process leaving pixel 17 of the delineated distortion as the next pixel to undergo processing.

Figure 11:
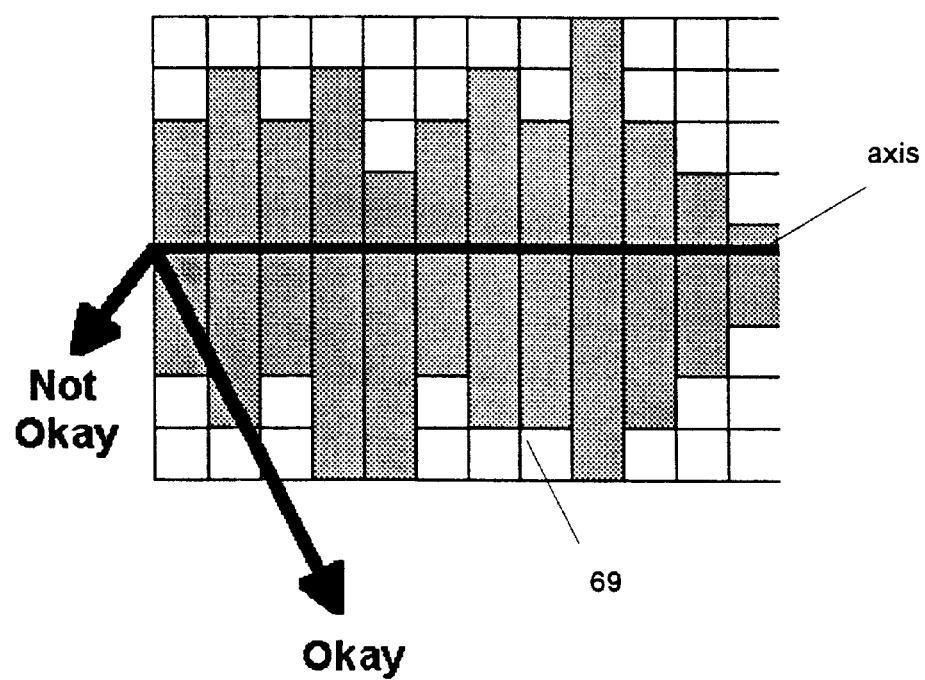
FIG. 11 is an illustrative example of those pixels within the neighborhood which may be utilized in the step of determining the value for the replacement pixel which will replace the pixel within the delineated distortion which is to be removed in accordance with the steps set forth in FIG. 9.

In step 86 the values for the replacement pixel which is to replace the pixel being removed are determined by the replacement pixel value calculator 69 as a function of the visual attributes of the pixels within the neighborhood. Specifically, the values for the replacement pixel are determined as a function of the values of those pixels within the neighborhood which meet a predetermined criteria. By way of example, the values for the replacement pixel may be an average of the values of the useful pixels within the neighborhood. In an embodiment of the invention, the pixels from the neighborhood are used to determined the values for the replacement pixel only when those pixels are: 1) located outside of the selection rectangle and generally perpendicular to the axis on which the scratch lies as illustrated in FIG. 11; 2) located within the selection rectangle but outside of the delineated distortion; or 3) located within the selection rectangle and within the delineated distortion but have previously been removed and replaced by the subject processes. For example, with reference to FIG. 10, the values for the replacement pixel which will replace pixel 17 would be determined by averaging the values for all those pixels within the illustrated neighborhood which are not shaded. This process is complete when the iterator 67 has touched all of the pixels within the delineated distortion.

In yet a further embodiment of the invention, pixels may also be excluded from the above valuation process if they have values which lie within a predetermined distance from the mean values associated with the scratch-pixel-sequence of the pixel being removed. In still a further embodiment of the invention, the criteria can be adaptive wherein only a predetermined number of pixels which most closely meet a predefined criteria are used in the valuation process. In addition, those of skill in the art will appreciate that various other forms of filtering and averaging may also be employed to establish the values for the replacement pixel.

Once the values for a replacement pixel have been determined, it is preferred that the replacement pixel be added to a digital correction sprite or image in step 88 which is to be ultimately composited with the digital source image in step 92 upon the completion of the iteration process. The compositing of the digital correction sprite with the digital source image results in the effective removal of the distortion from the portion of the image which was defined by the selection rectangle 68. As will be appreciated, the digital correction sprite is stored in one of the memory devices of FIG. 1 such a RAM 25 as it is being built and, when complete, will correspond to the delineated distortion. It will further be appreciated that it is also possible to directly composite or replace each individual pixel within the delineated distortion after each step in the iteration.

At this point, as discussed previously with respect to FIG. 4B, if further selection rectangles have been deposited over the image, the processes described above will automatically repeat to remove the distortions from each of the associated portions of the image. Additionally, the user may define further portions of the image to be edited and reinitiate the procedure described herein.

It will be appreciated that the invention described herein provides a method for automatically removing unwanted regions from a digital image. The removal of such unwanted regions is generally accomplished by identifying a portion of the digital image, identifying the unwanted region within the portion, extracting the unwanted region, and repairing the unwanted region using certain attributes describing the visual characteristics of areas of the digital image surrounding the unwanted region. When viewed in this manner, a similar approach to digital image editing may also be seen in commonly owned U.S. patent application Ser. No. 08/964,717 entitled "USER DIRECTED DUST AND COMPACT ANOMALY REMOVER FROM DIGITAL IMAGES" to Lawton and Qadir, filed Nov. 5, 1997, which is hereby incorporated by reference in its entirety.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a computer system, a method of removing from a digital image a narrow, elongated region of image distortion having a primary orientation, the method comprising the steps of: identifying the primary orientation; identifying and storing in a memory of the computer system a set of attributes of a portion of the digital image, the attributes comprising a plurality of substantially one-dimensional pixel slices oriented by reference to the primary orientation; delineating the image distortion within the portion of the digital image as a function of the attributes stored in the memory; and removing the delineated image distortion utilizing a pixel replacement process.

2. The method as recited in claim 1, further comprising the step of allowing a user of the computer system to select the portion of the digital image.

3. The method as recited in claim 1, further comprising the steps of displaying the digital image on a display device of the computer system and allowing the user to select the portion of the digital image by interacting with the displayed digital image.

4. The method as recited in claim 3, wherein a movable selection rectangle under the control of the user is displayed on the display device which the user employs to interact with the displayed digital image.

5. The method as recited in claim 4, wherein the selection rectangle has a width and a length which are adjustable by the user.

6. The method as recited in claim 3, wherein a sequence of movable selection rectangles under the control of the user are displayed on the display device which the user employs to interact with the displayed digital image.

7. The method as recited in claim 6, further comprising the step of causing the sequence of movable selection rectangles to automatically overlap.

8. The method as recited in claim 1, wherein the step of delineating the distortion comprises the step of evaluating each slice to determine if a scratch-pixel-sequence exists therein.

9. The method as recited in claim 8, wherein the step of delineating the distortion within each slice further comprises the step of redefining the scratch-pixel-sequence for each slice as a function of the scratch-pixel-sequence of neighboring slices.

10. The method as recited in claim 1, wherein the pixel replacement process comprises the steps of locating within the delineated distortion a pixel to be removed, establishing a local neighborhood of pixels around the pixel to be removed, determining from the values of the neighborhood of pixels values for a replacement pixel, and replacing the pixel to be removed with the replacement pixel.

11. The method as recited in claim 10, further comprising the steps of storing the replacement pixel within a digital correction image and thereafter compositing the digital correction image with the digital image.

12. The method as recited in claim 10, wherein only those pixels within the neighborhood of pixels which are located outside of the portion of the image selected and generally perpendicular to a major axis of the portion of the image selected, located within the portion of the image selected and not within the delineated distortion, and located within the portion of the image selected and within the delineated distortion but previously replaced with the replacement pixel are utilized in determining the values for the replacement pixel.

13. The method as recited in claim 10, wherein only those pixels within the neighborhood of pixels which lie outside a predetermined distance from a mean value of those pixels which comprise the delineated distortion are utilized in determining the values for the replacement pixel.

14. The method as recited in claim 10, wherein only those pixels within the neighborhood of pixels which meet a predefined criteria are utilized in determining the values for the replacement pixel.

15. A computer-readable medium having computer-executable instructions for performing a method of removing a narrow, elongated region of image distortion from a digital image, the method steps comprising: identifying a primary orientation of the image distortion; identifying and storing in a memory of a computer system a set of attributes of a portion of the digital image resident on the computer system, the attributes comprising a plurality of substantially one-dimensional pixel slices oriented by reference to the primary orientation; delineating a narrow, elongated region of image distortion within the portion of the digital image as a function of the attributes stored in the memory; and removing the delineated image distortion utilizing a pixel replacement process.

16. The computer-readable medium as recited in claim 15, further performing the steps of displaying the digital image on a display device associated with the computer system and identifying the portion of the digital image in response to a user interacting with the displayed digital image.

17. The computer-readable medium as recited in claim 15, wherein the step of delineating the image distortion comprises the step of evaluating each slice to determine if a scratch-pixel-sequence exists therein.

18. The computer-readable medium as recited in claim 15, wherein the pixel replacement process comprises the steps of locating within the delineated distortion a pixel to be removed, establishing a local neighborhood of pixels around the pixel to be removed, determining from the values of the neighborhood of pixels values for a replacement pixel, and replacing the pixel to be removed with the replacement pixel.

19. A computer system comprising: a memory on which is stored a digital image comprising a plurality of pixels and having a narrow-elongated region of visual distortion; a user interface for allowing a user to identify a pixel area of the image which includes the visual distortion; and a tool for automatically removing the visual distortion from within the pixel area, the tool comprising 1) a row/column slicer for identifying a primary orientation of the visual distortion and for creating a plurality of substantially one-dimensional pixel slices oriented by reference to the primary orientation; 2) an extraction filter for automatically identifying and collecting attributes of the pixel slices and identifying a subset of the pixel area which defines the visual distortion as a function of the collected attributes; and 3) a replacement pixel value calculator for determining values for use in forming a corrected subset of the pixel area based, at least in part, on the collected attributes, wherein the subset of the pixel area is replaced with the corrected subset of the pixel area resulting in the effective removal of the visual distortion.

20. The computer system as recited in claim 19, further comprising a display device for use in displaying the digital image and wherein the user interface further comprises an input device for allowing the user to select the pixel area by interacting with the digital image when it is displayed on the display device.

21. The computer system as recited in claim 19, wherein the extraction filter identifies the subset of the pixel area by evaluating the attributes of each slice to determine if a scratch-pixel sequence exists therein.

22. The computer system as recited in claim 19, further comprising an iterator and a compositor, wherein the iterator locates a pixel within the subset of the pixel area which is to be removed, the replacement pixel value calculator establishes a neighborhood of pixels around the pixel to be removed and determines an image value for a replacement pixel based upon image values of the neighborhood of pixels, and the compositor composites the replacement pixel with the pixel to be removed.

23. A method for automatically removing from a digital image an unwanted region, the method comprising the steps of: identifying a portion of the digital image containing at least a portion of the unwanted region; identifying the primary orientation of the portion of the unwanted region contained within the identified image portion; storing in a memory of a computer system a set of attributes of the image portion, the attributes comprising pixel value attributes of a plurality of substantially one-dimensional pixel slices oriented by reference to the primary orientation of the portion of the unwanted region; identifying the unwanted region portion within the image portion using the set of attributes stored in the memory; extracting the portion of the unwanted region; repairing the extracted unwanted region portion using information from a set of attributes describing visual characteristics of an area of a portion of the digital image surrounding the unwanted region; and, compositing the repaired region and the digital image so that the repaired region replaces the unwanted region.

* * * * *